Oct. 24, 1933.    E. L. FONSECA    1,931,863
DIRECT ACTING HEATER CONTROL THERMOSTAT
Filed March 7, 1930
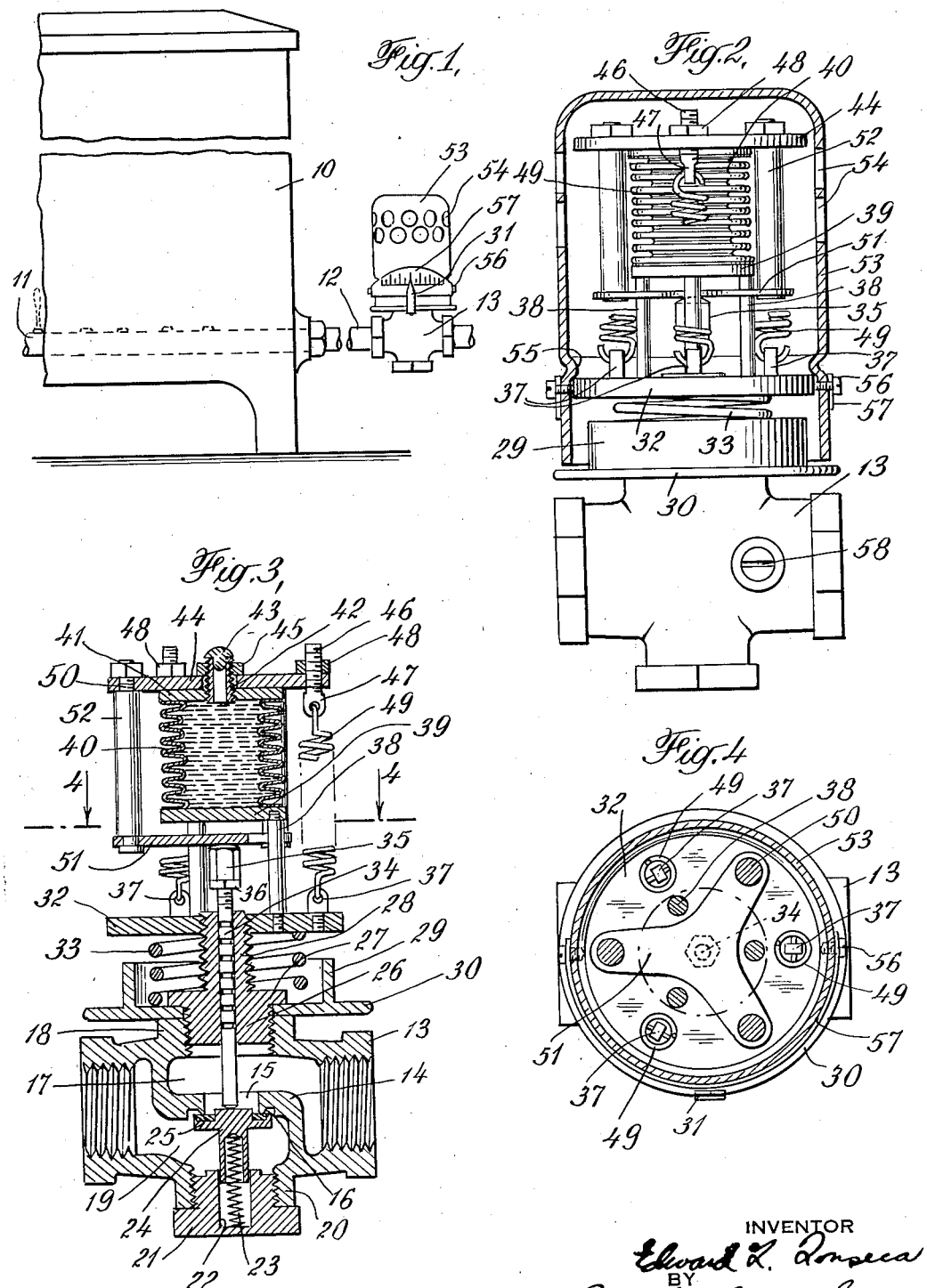
INVENTOR
Edward L. Fonseca
BY
ATTORNEYS Patented Oct. 24, 1933

1,931,863

UNITED STATES PATENT OFFICE

1,931,863

DIRECT-ACTING HEATER CONTROL THERMOSTAT

Edward L. Fonseca, Newark, N. J., assignor to The Wilcolator Company, Newark, N. J., a corporation of Delaware Application March 7, 1930. Serial No. 433,947

3 Claims. (Cl. 236—99)

This invention relates to thermostatic control devices for heaters and has particular reference to thermostatic control devices for governing the volume of flow of a fluid to a heater adapted to heat the air of a room or other enclosed space.

The principal object of this invention is to provide a direct-acting thermostatic control device of the type described, which is a compact and self-contained unit adapted to be emplaced in existing heating systems without requiring any alteration therein. More particularly, the control device of this invention may be introduced as a compact unit in the supply pipe of a gas-fired circulating heater, in the steam or hot water supply pipe to a radiator, in the supply line of a liquid fuel burner, or the like, and is adapted to be positioned at a point where it is most susceptible to changes in the temperature of a room or other enclosed space.

Another object of this invention is to provide a device of the character described in which the thermostatic element is mounted sufficiently remote from the supply pipe, in which the device is introduced, so as to be unaffected by the temperature of the fluid flowing in the pipe. For example, if the thermostat were mounted in immediate proximity to the supply pipe in which the device is interposed, the temperature of the gas or liquid fuel in the supply pipe, which usually passes through cold earth or is drawn from outdoor reservoirs, would cause the device to operate at a higher temperature than that at which it is pre-set to operate, with the result that the room would be heated to an excessively high temperature, while the reverse would be the rule if the device were interposed in a hot water or steam supply line.

A further object of this invention is to provide a device of the type described in which the valve in the supply pipe, and which is controlled by the thermostat, is a separate unit and removable and replaceable at will without dismounting or otherwise disturbing the thermostatic mechanism or the setting thereof.

These and other objects of this invention are obtained in a preferred embodiment of this invention consisting of a valve body adapted to be interposed in the supply line to the heater and containing a valve which is normally constrained in closed position by a spring mounted in a removable valve seat, whereby the valve may be removed at will for cleaning, repair and replacement purposes. Extending into the opposite side of the valve body and engaging the valve at one end is a push rod, whose other end engages the thermostatic mechanism, which is adjustable with respect to the rod by a threaded connection with the valve body, whereby the valve may be set to close and open at a predetermined temperature. The thermostatic mechanism consists of a cage containing a flexible metal bellows in which is sealed a thermo-sensitive gas or fluid, this bellows being arranged to expand outwardly to allow the valve spring to close the valve at a predetermined high pressure, and to collapse gradually under the tension of springs during decrease in temperature below a predetermined point to force the push rod against the valve whereby the latter is unseated to permit the flow of steam, water, liquid fuel, gas or the like to the heater of the air space in which the device is located.

Inasmuch as the device is a completely balanced unit and its operation is independent of gravity, line pressures, fluid flow or the like, it may be mounted in any position or angle and at any point, such as in place of the manual valve of a hot water or steam radiator, in the path of the intake air of a gas-fired circulating heater, or the like.

The new device is also so arranged that it can be readily calibrated by both the hot and cold check methods so that elaborate and careful laboratory tests and instruments are not required to calibrate the device.

For a better understanding of this invention, reference may be had to the accompanying drawing, in which Figure 1 illustrates a gas-fired, air circulating heater, in the gas supply line of which is interposed the direct-acting control thermostat of this invention;

Fig. 2 is an enlarged elevational view of the direct-acting control thermostat of this invention, with the hood in partial section to expose a portion of the operating mechanism;

Fig. 3 is a vertical section through the control thermostat, showing all of the operating parts thereof; and Fig. 4 is a horizontal section of the thermostat as seen along the line 4—4 of Fig. 3.

In the drawing, with particular reference to Fig. 1, numeral 10 designates a gas-fired, circulating heater having burners 11, which are supplied by gas supply pipe 12, in which is interposed the valve body 13 of the thermostat of this invention. The use of the thermostat of this invention in the gas supply line of a gas-fired circulating heater is merely illustrative, inasmuch as the thermostat may be mounted in a hot water or steam supply line to a radiator instead of the heater 10, or the supply line 12 may be a fuel feed for a liquid fuel burner of any form.

The valve body 13 is provided with the usual cross diaphragm or wall 14, which is pierced by the valve passage 15 and provided with a knife edge valve seat 16 at the edge of the opening 15. The outlet chamber 17 is provided with a threaded extension 18, and the intake chamber 19 is also provided with a threaded extension 20, which is preferably placed directly opposite to the extension 18, as shown particularly in Fig. 3. Removably threaded in extension 20 is a cap 21 having an axial bore 22 which serves jointly as the seat for the valve spring 23, and as a pilot for the stem of valve 24, which has an annular recess in which is placed a ring 25 of non-metallic packing material such as leather, which is adapted to engage the knife edge 16 of the valve seat when the valve is in closed position. It is to be noted that the valve spring 23 normally constrains the valve 24 in closed position as shown in Fig. 3.

Threaded into opposite extension 18 is a plug 26 having an axial bore, an annular shoulder 27, and a threaded extension 28. The shoulder 27 is sealed against the flanged cup 29, soldered or otherwise secured in place against rotation on the upper surface of extension 18 of the valve body 13. Fitted to the flange 30 of cup 29 is a pointer 31 shown in Fig. 1, whose purpose will be described later.

Adjustably mounted on the extension 28 of plug 26 is a ring 32 which is constrained in any adjusted position by a coil spring 33, engaging it and seated at its opposite end in the cup 29. Passing through the annular bore of plug 26 is a push rod 34, whose lower end normally engages valve 24, and whose upper end is fitted with an adjusting stud 35, whereby the effective length of the rod 34 may be varied, this stud 35 being locked in any adjusted position by the lock nut 36 on push rod 34.

Three screw eyes 37 are provided on the upper surface of ring 32, as shown particularly in Figs. 2, 3, and 4. Also mounted on the upper surface of ring 32 by means of pins 38 tapped into ring 32 at one end, is a relatively stationary platform 39, which forms the lower end of an expansible and contractile flexible metal bellows 40, the upper end of which is sealed by the plate 41, through which is threaded a filling tube 42. Through this filling tube 42 is charged a gas or a fluid having a high coefficient of volumetric expansion at a certain predetermined pressure, after which the tube 42 is sealed by solder 43 or the like. In a preferred embodiment, sulphur dioxide is used as the thermo responsive material which is charged into bellows 40, as sulphur dioxide has been found to be very effective for this purpose, having a vapor pressure of thirty pounds at 70° F. and giving approximately a sixteen pound increase in pressure for every 20° F. increase in temperature.

The filling tube 42 passes through an aperture in the center of a disc 44, and is held in place on this disc by means of a nut 45, as shown in Fig. 3. This nut serves to hold the upper end of the bellows in position against lateral movement. Disc 44 is apertured at three points near its periphery for the slidable reception of three threaded pins 46 having eyes 47 at their lower ends and each adjustable axially by a nut 48 engaging the upper surface of disc 44. The hooked ends of three coil springs 49 are passed through eyes 47 and 37 as shown in Fig. 3, and the tension of these springs is adjustable by adjusting nuts 48 to secure the axial movement in either direction of pins 46 relatively to disc 44. It will be seen that the springs 49 tend to restrain the expansion of bellows 40, since the lower support 39 of bellows 40 is relatively stationary while the upper disc 44 is movable outwardly by any expansion of bellows 40 against the tension of springs 49 and is movable inwardly by springs 49 upon any contraction of bellows 40. Three bolts 50 are suspended from disc 44 and carry at their lower ends a triangular spider 51 which lies between the three pins 38, but not in contact with either one of them. The spider 51 is maintained spaced from disc 44 by spacers 52 mounted upon each of the three bolts 50. The lower surface of spider 51 is adapted to be in contact with the stud 35 of valve push rod 34 as shown particularly in Fig. 3.

Adapted to be mounted over the thermostatic mechanism just described is a hood or cover 53 provided with a plurality of apertures 54 and an interior bead 55 which is adapted to rest on the upper surface of ring 32 as shown in Fig. 2. Below this bead 55 is a pair of set screws 56 whose points are adapted to engage the edge of ring 32 for securing thereto the hood 53, as shown in Fig. 2. These set screws 56 may also serve as means for holding in place on the outer surface of the hood 53 the dial 57, which cooperates with the stationary pointer 31. The hood 53 is so arranged that by grasping it and turning it in either direction, the thermostatic control device of this invention may be preset to control the supply of fluid passing through valve body 13 to a heater, so that the heater controls the temperature of a room or other enclosed space at the predetermined temperature to which the pointer 31 and dial 57 are set. By referring to Figs. 2 and 3, it will be seen that by turning the hood 53, the ring 32 is also turned on the threaded stud 28 to vary the relation between the stud 35 of push rod 34 and spider 51, which is controlled by the thermostat and spring combination as described above. The extension 28 of plug 26, upon which ring 32 is adjustably mounted, is provided with a twelve-pitch screw, and the dial 57 is so calibrated that one-half a calibration turn of the hood 53 procures two and one-half thousandths of an inch travel per degree F. of the valve 24, that is, the valve is opened or closed earlier or later in accordance with the dial adjustment.

In operation, the control device of this invention is mounted in a supply pipe 12, which may be for either gas, hot water, steam, liquid fuel, or other fluid adapted for operating a heater of some kind, such as the gas-fired air circulating heater 10, a hot water or steam radiator, a liquid fuel burner, or the device may be used for controlling the flow of a refrigerating fluid, such as brine or the like. Assume that it is desired to maintain a room at 70° F., in which case the user grasps hood 53 and turns it until the stationary pointer 31 indicates the graduation on the dial 57 corresponding to 70° F. temperature. This causes an adjustment of ring 32 and the thermostatic mechanism mounted thereon with respect to the stationary valve mechanism, so that a variation in relative positions of valve push rod 34 and spider 51 takes place. If the temperature is considerably below 70° F., the springs 49 contract the bellows 40 so that the disc 44 and spider 51 are depressed in such a way that the spider 51 forces valve push rod 34 downwardly to open valve 24 against the pressure of valve spring 23, which normally constrains valve 24 in closed position. This permits the flow of the gas through pipe 12 to the burners 11, to increase the effective heating capacity of the heater 10, whereby the temperature of the room is raised. If an air circulating heater is used, it is preferred that the device of this invention be mounted as indicated in Fig 1, in order that it may be placed immediately in the air stream which is drawn by convection into the open lower end of burner 10, whereby the device lies in a current of air of the normal room temperature. As this circulating air is warmed up by the heater 10, the thermoresponsive material in bellows 40 expands against the tension of spring 49 to raise disc 44 and connected spider 51. In so rising, the spider 51 tends to draw away from the stud 35 of push rod 34, but the push rod follows the spider 51 because valve spring 23 pushes it upwardly and gradually closes the passage 15 to decrease the supply of gas and eventually shut it off, when the temperature of the circulating air reaches 70° F., at which the dial 57 was preset.

Conversely, as the temperature falls, the thermoresponsive material in bellows 40 contracts, thus allowing springs 49 to collapse the bellows 40, with the result that spider 51 forces push rod 34 downwardly to open valve 24, permitting a further flow of gas to the burners 11, which are preferably always maintained lighted or are provided with a pilot burner not shown, which is maintained lighted by means of a connection with the gas line ahead of the valve body 13, such as by means of a by-pass connection 58 placed in the valve body 13 in accordance with the usual practice. Obviously, if the control device of this invention is used on a hot water, steam, liquid fuel, or other fluid supply line, the by-pass connection 58 will not be used, but may be sealed by a suitable plug, or dispensed with entirely.

It will be seen that the thermostatic control device of this invention is completely direct-acting, requiring no connection with any remote thermostatic control or other operating device. The thermostat 40, although mounted on the valve body 13, is placed sufficiently remote therefrom so that it is unaffected by the temperature of the fluid flowing in pipe 12. For example, gas is usually piped from below the ground, and liquid fuels are usually stored in reservoirs buried under the ground, so that both gas and liquid fuels are cold as they flow through pipe 12, and therefore would affect the proper operation of the thermostat 40 if it were not placed sufficiently remote therefrom. Similarly, the thermostat would be affected by the high temperatures of steam and hot water flowing in pipe 12 if it were not mounted sufficiently remote therefrom as in applicant's arrangement. Also, the device does not depend on gravity, fluid flow, or the like for its operation, and therefore may be mounted in any position, such as upside down, at any lateral angle, horizontally or the like, whichever position suits installation requirements. Also, the valve 24 is removable together with its spring 23 by removing cap 21, without in any way disturbing the thermostat 40 or the adjustment of dial 57. Thus, the thermostat may remain set at a predetermined temperature at all times, and the valve 24 may be removed independently thereof for cleaning, inspection, relining, or replacement.

It should be noted that, contrary to the usual operation of thermostats, the contraction of the thermostat 40 serves to directly operate the valve, but its expansion does not directly operate the valve, but, on the contrary, spring 23 tends to close the valve and maintain it in closed position. The springs 49, on the other hand, are interposed between the thermostat and the valve and resist any tendency of the thermostat 40 to permit the closure of the valve by expansion, these springs 49, on the contrary, tending to open the valve by pulling downwardly on disc 44 carrying spider 51, which forces the push rod 34 downwardly to open the valve 24.

The cage in which the thermostat 40 is mounted is so arranged as to prevent any rupture of the bellows 40 by over-expansion thereof, inasmuch as during any over-expansion which is not restrained by springs 49, the spider 51 engages platform 39, to hold the bellows 40 against any further expansion. It will be seen that the device may be calibrated readily by both the cold check and hot check methods. By the cold check method, the device may be calibrated simply by releasing the set screws 56 with the valve closed and setting the pointer 31 opposite a predetermined high temperature on dial 57. By the hot check method, the temperature may be gauged by a thermometer or the like placed in a room heated by the stove 10, and the set screws loosened to turn the dial 57 so that the pointer 31 indicates the temperature of the room at that time as shown by the thermometer.

While a preferred embodiment of the invention has been described and illustrated herein, it is to be understood that the invention is not to be limited thereby, but is susceptible to changes in form and detail within its scope.

I claim:

1. In a thermostatic device, the combination of a valve body, a valve therein, an expansible and contractile chamber having a fixed part mounted upon said body, and a part movable away from said body in response to increases in temperature, means interposed between the movable part of said chamber and said body for restraining the movement of the former, connections between the movable part of said element and said valve whereby the former operates the latter, means in said connections for adjusting the relation between the movable part of said element and said valve, a hood mounted over said element and connected to said last named means, whereby the latter may be adjusted, and a scale and pointer associated with said last named means whereby the latter may be adjusted to indicate a predetermined temperature.

2. In a thermostatic device, the combination of a valve body, a valve therein, means constraining said valve in closed position, a self-contained thermostatic element in substantial alignment with the axis of movement of the valve, adjustable mounting means on the valve body holding the part of the thermostatic element nearest the valve body in a predetermined relation thereto, another part of said element being movable with respect to said first part in response to increase in temperature for closing the valve, means for restraining said movement, and connections between the movable part of said element and said valve whereby upon movement of the movable part of the thermostatic element movement is imparted to said valve.

3. In a thermostatic device, the combination of a valve body, a valve therein, means constraining said valve in closed position, a self-contained thermostatic element in substantial alignment with the axis of movement of the valve, adjustable mounting means on the valve body holding the part of the thermostatic element nearest the valve body in a predetermined relation thereto, another part of said element being movable with respect to said first part in response to increase in temperature for closing the valve, means for restraining said movement, and connections between the movable part of said element and said valve whereby upon movement of the movable part of the thermostatic element movement is imparted to said valve, said connections including means for adjusting the relation between the movable part of the element and the valve.

EDWARD L. FONSECA.